(12) United States Patent
Benveniste et al.

(10) Patent No.: US 6,795,897 B2
(45) Date of Patent: Sep. 21, 2004

(54) SELECTIVE MEMORY CONTROLLER ACCESS PATH FOR DIRECTORY CACHING

(75) Inventors: Caroline Benveniste, New York, NY (US); Vittorio Castelli, Croton-on-Hudson, NY (US); Peter A. Franaszek, Mount Kisko, NY (US)

(73) Assignee: International Business Machines Corporation, Armonk, NY (US)

(*) Notice: Subject to any disclaimer, the term of this patent is extended or adjusted under 35 U.S.C. 154(b) by 159 days.

(21) Appl. No.: 10/146,692

(22) Filed: May 15, 2002

(65) Prior Publication Data

US 2003/0217237 A1 Nov. 20, 2003

(51) Int. Cl.[7] .............................................. G06F 12/00
(52) U.S. Cl. ........................ 711/118; 711/202; 707/101; 710/68
(58) Field of Search .................. 711/202–203, 205–207, 711/3, 118, 159; 710/68; 707/101

(56) References Cited

U.S. PATENT DOCUMENTS

| | | | |
|---|---|---|---|
| 5,729,228 A | 3/1998 | Franaszek et al. | 341/106 |
| 5,761,536 A | 6/1998 | Franaszek | 710/68 |
| 5,864,859 A | 1/1999 | Franaszek | 707/101 |
| 6,173,381 B1 * | 1/2001 | Dye | 711/170 |
| 6,349,372 B1 | 2/2002 | Benveniste et al. | 711/159 |
| 6,353,871 B1 | 3/2002 | Benveniste et al. | 711/3 |

* cited by examiner

Primary Examiner—Nasser Moazzami
(74) Attorney, Agent, or Firm—F. Chau & Associates, LLC

(57) ABSTRACT

A computer system and corresponding method for supporting a compressed main memory includes a processor, a processor cache in signal communication with the processor, a memory controller in signal communication with the processor cache, a compression translation table entry register in signal communication with the processor cache and the memory controller, a compression translation table directory in signal communication with the compression translation table entry register, and a compressed main memory in signal communication with the memory controller wherein the memory controller manages the compressed main memory by storing entries of the compression translation table directory into the processor cache from the compression translation table entry register; where the corresponding method includes receiving a real address for a processor cache miss, finding a compression translation table address for the cache miss within the processor cache, if the cache miss is a cache write miss: decompressing the memory line corresponding to the cache line being written, writing the content of the cache line into the appropriate position in the memory line, compressing the data contained in said memory line, and storing the compressed data into the compressed main memory, and, if the cache miss is a cache read miss: retrieving the compressed data corresponding to the compression translation table address from the compressed main memory and decompressing the retrieved data.

32 Claims, 3 Drawing Sheets

SELECTIVE MEMORY CONTROLLER ACCESS PATH FOR DIRECTORY CACHING

BACKGROUND

Generally, a computer system's main memory has not been subject to data compression. An emerging development in computer organization is the use of data compression in a computer system's main memory, where data in the main memory itself is stored in a compressed format.

A trend in computer architectures is to aggregate the largest possible number of functional components within the package of the processor chip. Hence, architectures in which the memory controller resides on the same chip as the processor would have advantages of reducing communication delays between the processor and the memory controller and of permitting a single-chip package. A potential disadvantage, however, is the limited amount of space available on the processor chip.

More specifically, a large portion of the processor chip space is typically devoted to the level-2 ("L2") cache, which is usually as large as possible. Hence, there is usually not enough additional space for further caches, such as a line buffer, directory cache and/or level-3 ("L3") cache. Additionally, the number of pins available on a chip is finite, and most of the pins on a processor chip are already used, and cannot be spared to connect the memory controller to an external cache and/or buffer. With no directory cache and/or L3 cache, the latency associated with memory fetches can be large.

SUMMARY

These and other drawbacks and disadvantages of the prior art are addressed by a computer system and corresponding method for supporting a compressed main memory.

The computer system includes a processor, a processor cache in signal communication with the processor, a memory controller in signal communication with the processor cache, a compression translation table entry register in signal communication with the processor cache and the memory controller, a compression translation table directory in signal communication with the compression translation table entry register, and a compressed main memory in signal communication with the memory controller wherein the memory controller manages the compressed main memory by storing entries of the compression translation table directory into the processor cache from the compression translation table entry register.

The corresponding method includes receiving a real address for a processor cache miss, finding a compression translation table address for the cache miss within the processor cache, if the cache miss is a cache write miss: decompressing the memory line corresponding to the cache line being written, writing the content of the cache line into the appropriate position in the memory line, compressing the data contained in said memory line, and storing the compressed data into the compressed main memory, and, if the cache miss is a cache read miss: retrieving the compressed data corresponding to the compression translation table address from the compressed main memory and decompressing the retrieved data.

These and other aspects, features and advantages of the present disclosure will become apparent from the following description of exemplary embodiments, which is to be-read in connection with the accompanying drawings.

BRIEF DESCRIPTION OF THE DRAWINGS

The present disclosure teaches a computer system and method for supporting a compressed main memory in accordance with the following exemplary figures, in which.

DETAILED DESCRIPTION OF PREFERRED EMBODIMENTS

A system and method are disclosed for providing a selective memory controller access path for directory caching. The system is configured so that the contents of main memory are kept in a compressed format, such as, for example, as in machines with IBM's Memory Expansion Technology ("MXT™"). The corresponding method reduces the delay of decompressing compressed memory by caching the compressed-memory directory into the processor's Level-2 ("L2") cache.

There are three components to decompression latency: first, the cost of accessing the directory known as the compression translation table ("CTT"), which contains information required to decompress; second, the cost of retrieving the compressed data from main memory; and third, the additional latency introduced by the decompressor. Some architectures may hide the three latency components by using an additional large level-3 ("L3") cache memory, containing uncompressed data. When the unit of compression is larger than the line of the lowest cache level (e.g., L3), a small additional cache can be used that contains the compression units that have most recently been decompressed. Such an additional cache is called a "line buffer". A compression translation table ("CTT") cache as used in the IBM MXT™ architecture may also be included. The CTT cache holds recently referenced entries of the compression translation table. These components, the L3 cache, CTT Cache and Line Buffer, can be paired or combined together to produce different architectures.

The current trend in microprocessor design is to physically build as many components as possible within the chip containing the processor core. Hence, L1 and L2 caches, as well as the MMU, will likely be contained in the same package as the processor core, and will thereafter likely be located on the same chip. This trend has several drawbacks including the lack of space within the chip for large L3 caches and additional caches such as the CTT Cache and the Line Buffer; as well as the limited number of pins available on the chip, which restricts the ability to locate these caches outside the chip. In the present disclosure, embodiments are taught that achieve advantages similar to those of a CTT Cache, but use strategic changes to existing processor chip architectures.

Figure 1:
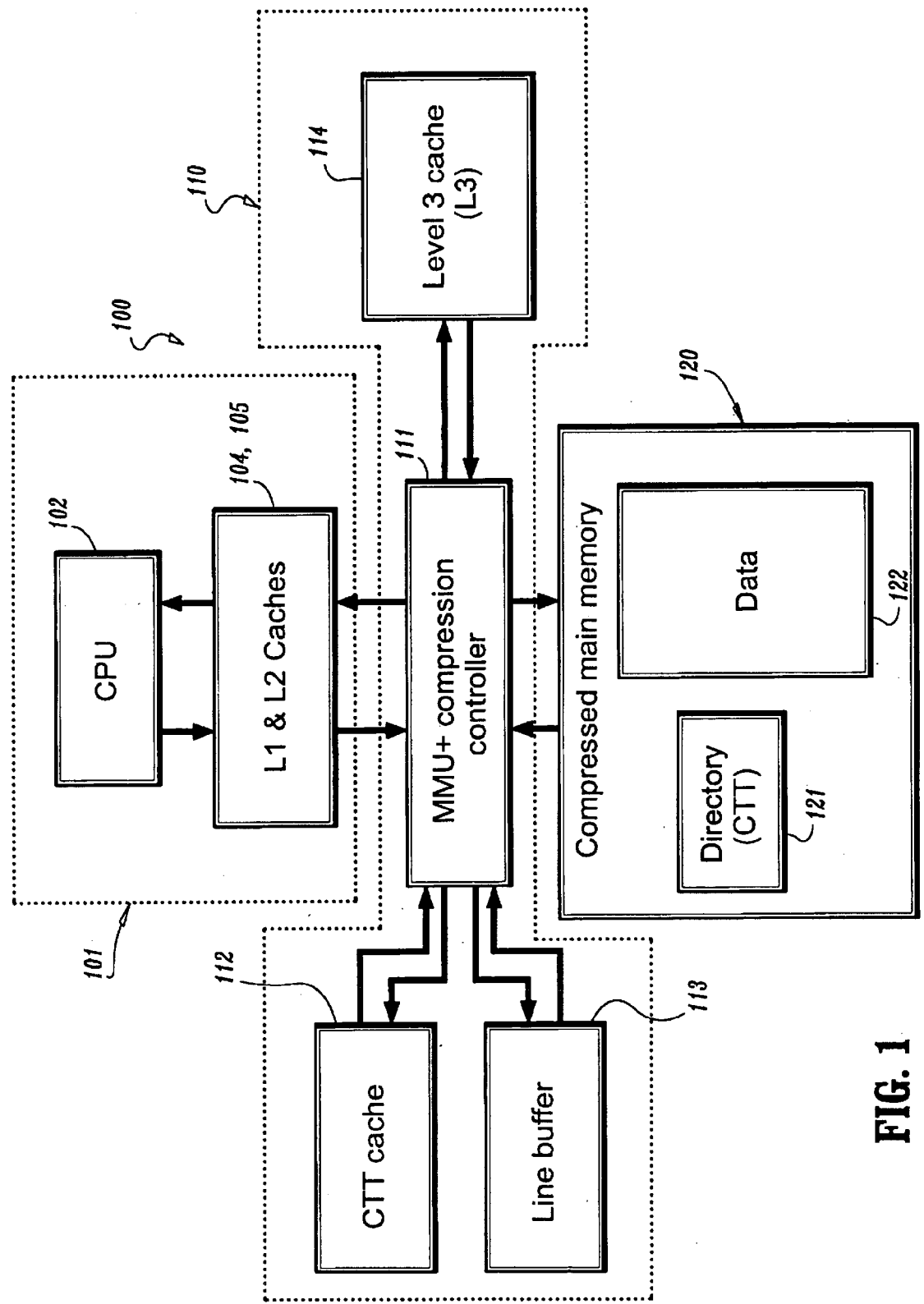
FIG. 1 shows a block diagram structure for a computer system supporting a compressed main memory.

As shown in FIG. 1, a computer system 100 is logically divided into a Central Processing Unit ("CPU") and cache subsystem 101, a memory subsystem 120, and a memory control unit 110, which provides an interface between a CPU 102 and the memory 120. The CPU and cache subsystem 101 includes at least one CPU 102, one or more L1 caches 104 and/or one or more L2 caches 105. The subsystem also has a Translation Lookaside Buffer ("TLB") or a hierarchy of TLBs, which are caches used to translate virtual addresses, as generated by processes, into real addresses as stored in the caches and manipulated by a Memory Management Unit ("MMU") 111.

In compressed-memory systems, such as, for example, IBM's MXT™ architecture systems, the compressed main memory 120 is logically divided into a directory 121 and a data portion 122. The directory is used to translate real addresses as generated by the processor subsystem into physical addresses corresponding to physical locations in the memory. The Compression Translation Table ("CTT") directory 121 is described infra with reference to FIG. 2. The data portion 122 of the memory 120 is divided into fixed-size units called sectors, having typical sizes of 128 or 256 bytes. Sectors are either used by compressed lines, in which case the CTT-entries of the corresponding compressed lines contain pointers to them; or are unused and organized in a linked list called a free list.

The memory controller unit or subsystem 110 comprises a memory management unit ("MMU") 111, which, in preferred MXT™ architectures, contains the compressor and decompressor, a level-3 ("L3") cache 114, a CTT cache 112 for entries of the compressed main memory directory 121, and a line buffer 113, which contains recently uncompressed memory lines. The unit of compression in the compressed main memory is called a memory line, which is typically a fraction of a memory page. Compressibility and latency tradeoffs indicate that one acceptable size for memory lines is 1024 bytes or 1 Kb.

In operation, an exemplary MXT™ computer works as follows, where, for purposes of explanation, the L3 line size is equal to the memory line size and where the line buffer is not present. Upon an L2 miss, the memory controller 111 references the L3 cache. If the reference results in a hit, the operation, which may be a read or a write, is carried out on the cached data. Upon an L3 cache miss, a new line is read from memory and used to replace a line currently in the L3 cache. The replaced line is discarded, if clean, or is otherwise compressed and written back to memory. In this case, while the line is compressed, the memory controller retrieves the corresponding CTT-entry from the CTT directory. If the size of the newly compressed line is the same as the size of its invalid version in memory, the line is written in place. If it is smaller, sectors are released and put on the free list. If it larger, the appropriate number of sectors are retrieved from the free-sector list. Then, the CTT-entry is written back into place.

To read a line from memory, the memory controller first retrieves its CTT-entry, decodes it, retrieves the corresponding sectors and decompresses the line. When the desired L2 cache line becomes available, it is sent to the L2 for a read miss, or overwritten within L3 for a write miss. Thus, a CTT-cache hit reduces the delay of compressing/decompressing by one memory access cycle.

Having an L3 cache with a cache line size equal to the memory line size has pre-fetching benefits. However, often it is preferable to have an L3 cache with smaller lines, such as, for example, one having the same size lines as those of the L2 cache. In this case, only a portion of the decompressed memory line is retained, and the rest is discarded. However, if memory references exhibit locality, it is likely that neighboring portions of the memory line will be accessed as well shortly after the first L3 miss. To avoid multiple decompression operations on the same memory line, a small cache called the line buffer 113 can be used, which contains a small number of recently decompressed memory lines.

To further reduce the decompression delays, the data portion of the memory can be divided into an uncompressed area and a compressed area. The uncompressed area is a Virtual Uncompressed Cache ("VUC") that contains a fixed maximum number of decompressed memory lines, which are organized, for example, in a FIFO queue. When a new memory line is decompressed, it is added to the head of the queue, while the tail line is removed. If the tail line is dirty, it is read into the memory controller, compressed, and written back to memory outside the uncompressed area.

Figure 2:
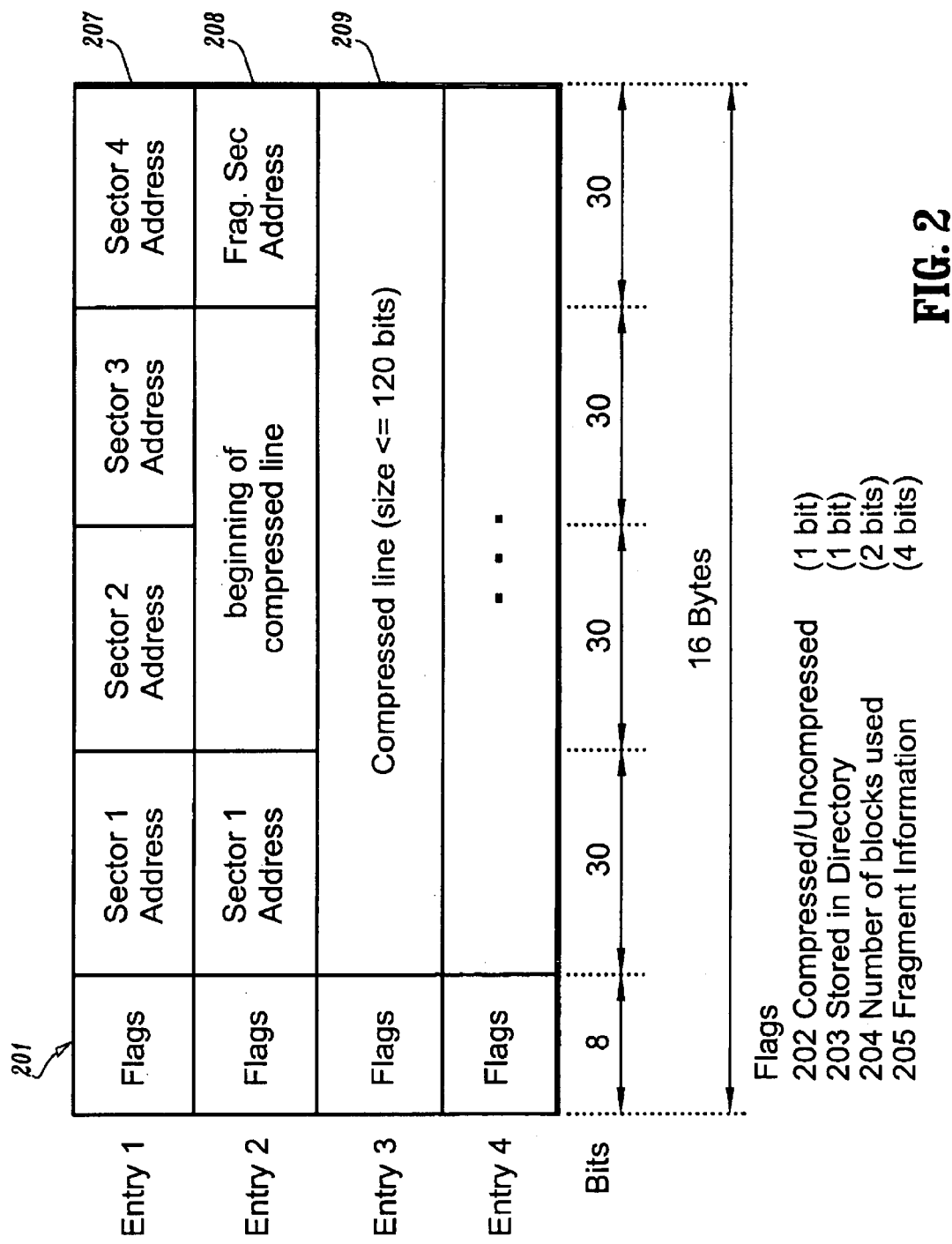
FIG. 2 shows a schematic data organization for entries of a memory directory in a computer system supporting a compressed main memory.

FIG. 2 shows exemplary organizations of the entries in the compression directory 121. Three different line organizations are shown. A first entry 207 contains a set of flags 201, and the addresses of four sectors. If the line size is 1024 bytes, and the memory sector size is 256, the line requires at most four sectors. A second entry 208 contains a set of flags, the address of the first sector used by the line, the beginning of the compressed line, and the address of the last sector used by the line. If the line requires more than two memory sectors, the sectors are connected by a linked list of pointers. Thus, each memory sector contains the address of the subsequent one. A third entry 209 contains a set of flags, and a highly compressed line, which compresses to 120 bits or less.

The flags in the example include a 1-bit flag 202 that indicates whether the line is stored in compressed or uncompressed format, a 1-bit flag 203 that indicates if the line is highly compressible and is stored entirely in the directory entry, a 2-bit flag 204 indicating how many sectors the line uses, and a 4-bit flag 205 containing the fragment information indicating what portion of the last used sector is occupied by the line.

Figure 3:
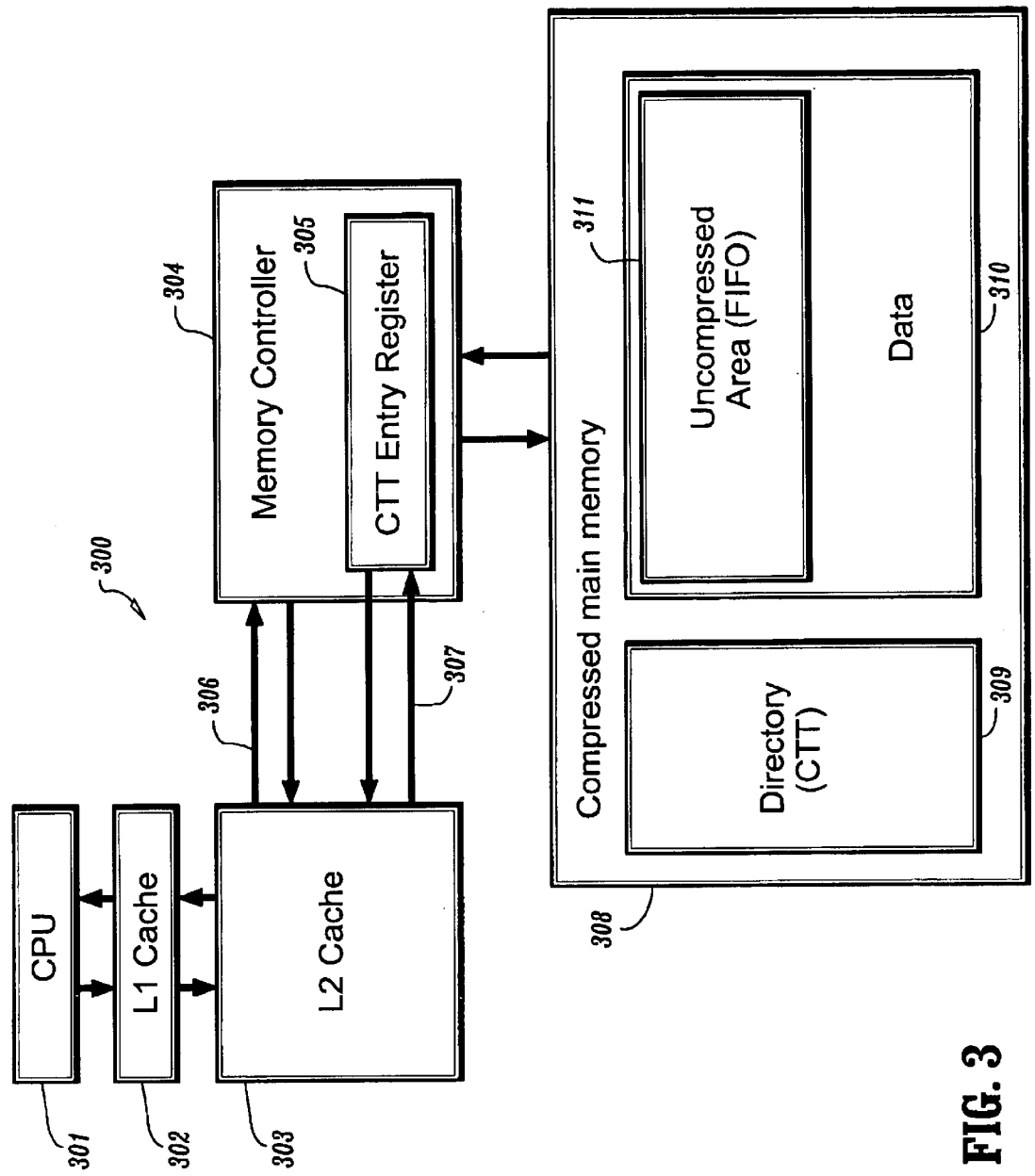
FIG. 3 shows a block diagram structure for a computer system supporting a compressed main memory wherein the memory controller can store entries of the compressed-memory directory into a processor cache.

Turning now to FIG. 3, space constraints and other drawbacks are overcome with an especially preferred computer system embodiment indicated generally by the reference numeral 300, wherein the memory controller stores CTT lines in the L2 cache. An important difference between this and the previously described architectures is that, here, there are ranges of physical addresses where the memory controller attempts to selectively retrieve data from and write data into the processor cache.

The addresses generated by the processor 301 go first to the L1 cache 302, then, in case of a miss or a write-back, to the L2 cache 303, and then are served by the memory controller 304. The path between the memory controller and the L2 cache is denoted by 306. The memory controller 304 is comparable to the element 111 of FIG. 1. Hence, the controller 304 also performs the compression/decompression operations, as well as the management of the compressed main memory 308. Thus, the controller 304 performs the translation between real addresses, as generated by the processor, and physical addresses.

To perform these operations, the memory controller retrieves the CTT-entry of the memory line on which it operates from the CTT directory 309, and stores it internally in a CTT-entry register 305. In the spirit of the present disclosure, the CTT-entry register has the same size as the L2 cache line, although alternate embodiments may have unequal sizes. Hence, it can contain multiple contiguous CTT-entries. For example, if the L2 line size is 32 bytes and the CTT-entry size is 16 bytes, the register will contain 2 CTT-entries. This embodiment adds a path 307 between the CTT Entry Register 305 of the memory controller 304 and the L2 cache 303, and this path enables the memory controller to directly store CTT-entries inside the L2 cache 303 and to retrieve them directly into the CTT Entry Register 305. The path 307 may be conceptual in alternate embodiments in that it need not correspond to dedicated physical connections between the memory controller 304 and the L2 cache 303, but can be implemented via additional connections and circuits residing within the controller 304.

Additionally, the data portion 310 of the compressed main memory 308 contains an uncompressed area 311 where the most recently accessed memory lines are kept decompressed, such as, for example, in a First-In First-Out ("FIFO") structure. The uncompressed area 311 need not be a physically contiguous set of addresses.

In an embodiment of the present disclosure, the uncompressed area is a logical entity, implicitly defined by the data structure used to manage it. For example, if the uncompressed area is managed by a FIFO list, each list entry contains a pointer to a CTT entry corresponding to a memory line maintained in uncompressed form. The content of the memory line is managed in the same fashion as that of memory lines outside the uncompressed area. Thus, it is divided among memory sectors which are scattered throughout the memory, and whose addresses are stored in the CTT entry.

Operational benefits of combining an uncompressed area with the ability of caching CTT-entries in the L2 cache are similar to those of combining a CTT-cache with an uncompressed area. Additionally, those of ordinary skill in the pertinent art will appreciate that the additional hardware required to support the present disclosure is reasonably limited, and that design embodiments may be highly cost-effective.

It shall be understood that, with embodiments of the present disclosure, the L2 cache contains both data whose real addresses are generated by the processor using one address generation scheme, and CTT-entries whose addresses are generated by the controller using a different address generation scheme. In an MXT™-style memory organization, real addresses are converted into physical addresses by the memory controller. The addresses of CTT-entries are physical addresses.

However, the memory manager component of an operating system is typically unaware of the existence of a translation layer between physical addresses and real addresses. A potential problem to be avoided is that a real address used by a process might coincide with a physical address of a CTT-entry.

Thus, in one embodiment, the L2 cache directory contains an additional flag bit or "physical address flag", which is used to distinguish between real addresses, usable by the processor, and physical addresses, usable only by the memory controller. When the memory controller stores a CTT line into the processor cache, the physical address flag is set to "on". Cache lines containing real addresses have the flag set to "off". Upon a L1 cache miss, the L2 cache is searched. If an address match occurs, and the physical address flag is "off", the search results in an L2 hit. However, if an address match occurs, but the physical address flag is "on", the result is an L2 miss. Conversely, when the memory controller queries the L2 cache for a CTT entry, an address match is considered a hit only if the physical address flag is "on", and is a miss if the physical address flag is "off".

Another embodiment does not require these changes to the structure of the processor cache. In this embodiment, the memory controller partitions the real address space into two sets. Addresses belonging to one of the sets are interpreted as real addresses, while addresses belonging to the other set are interpreted as physical addresses. In this embodiment, real addresses are not distinguished from physical addresses in the cache.

A third embodiment uses a property of IBM's XMT™ technology. Here, the compression-translation table ("CTT") or compressed-memory directory resides in a portion of memory where real addresses coincide with physical addresses. Each real address is either identical to a physical address, or needs to be translated using the CTT directory. In this embodiment, the operating system does not allocate and manage pages having real addresses in the real-equal-physical region. Thus, user and system processes will not have their virtual address space mapped to real addresses in the real-equal-physical region. The risk of confusion between real and physical addresses in the cache is therefore avoided, and the possibility of contaminating process data and code or cached CTT directory entries is therefore eliminated.

In an embodiment, the real-equal-physical region is initialized at Initial Program Load ("IPL") during startup, its size is equal to that of the CTT directory, and its starting physical address is the smallest address in physical memory (e.g., address 0x00000000).

In another embodiment, the real-equal-physical region consists of one or more intervals of physical addresses, where each interval is defined by a pair of registers in the memory controller: one of the registers contains the first address of the interval, while the 2nd register contains the last address of the interval. The contents of the registers are initialized at IPL.

In another embodiment, the paging subsystem of an operating system is prevented from allocating pages within the real-equal-physical region. In an operating system such as, for example, one used on a personal computer, this may be done by changing the status of the corresponding entries in the page frame number database to "Bad".

The policy for caching CTT-entries should be planned carefully to avoid performance problems. For example, one could envision a situation where a CTT-entry is cached, and a dirty cache line is written back to make space for the entry. If the CTT-entry of the dirty cache line is not cached, it must be read from memory. A careless CTT-entry caching policy might store this second CTT-entry in the cache, potentially evicting as a consequence a second dirty cache line. Again, the CTT-entry of this second dirty cache line might not be stored in the cache, and the cycle repeats. Such behavior could degrade the performance of a computer by unnecessarily flushing hot cache lines, and could potentially fill the write buffers of the processor cache. In this scenario, the first CTT-entry cannot be cached until the first dirty cache line is written back, which in turn must wait for its CTT-entry to be cached which cannot happen until the next dirty line is written back, etc.

To avoid such situations, an embodiment of the present disclosure has a memory controller that does not cache CTT-entries on cache write-backs. Upon the write-back of a cache line whose CTT-entry is not in the cache, the memory controller loads the CTT-entry, but does not cache it and discards it when the write-back is completed.

In another embodiment, upon a cache write-back of a cache line whose CTT-entry is not in the cache, while retrieving the CTT-entry from main memory, the memory controller checks whether said CTT-entry can be cached without evicting dirty cache lines, namely, by replacing clean or invalid cache lines. If this is the case, the CTT-entry is cached, otherwise it is discarded.

In yet another embodiment, upon a cached write-back of a cache line whose CTT-entry is not in the cache, while retrieving the CTT-entry from main memory, the memory controller both checks whether said CTT-entry can be cached without evicting dirty cache lines, and whether there is sufficient space in the write buffer used to buffer writes to main memory, herein referred to as "memory write buffer". The write buffer is maintained at the processor cache or at the memory controller. If the CTT-entry can be cached without causing further cache write-backs or if the utilization of the write buffer is low, the CTT-entry is cached. In another embodiment, a CTT entry is cached upon a writeback, after the writeback is complete.

In a computer system where the content of main memory is kept in compressed format, the translation between a real address as produced by the processor and the physical address of the memory cells containing the compressed data is performed using a CTT directory. Data is compressed and stored into compressed main memory upon cache writebacks. Upon cache misses, the content of memory is decompressed.

Embodiments include computer system architectures supporting compression of the content of main memory, where the memory controller responsible for managing the compressed content of main memory can store entries of the compressed main memory directory into a processor cache. The architecture has features allowing automatic discrimination between cache lines containing entries of the compressed main memory directory and cache lines with other types of content, such as code and data. Mechanisms for selective caching of the entries of the compressed main memory directory prevent the unnecessary eviction of the content of cache lines from the cache to free space for entries of the compressed memory directory, and eliminate the possibility of deadlocks that could result from unrestricted caching of the entries. The architecture can also be used in conjunction with compressed-memory management techniques that maintain in uncompressed form the content of recently accessed memory, where caching entries of the memory-compression directory significantly reduces the access time to said uncompressed memory.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented in firmware tangibly embodied on a program storage unit. The software may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the software, or any combination thereof, which may be executed by the hardware. In addition, various other peripheral units may be connected to the computer platform such as an additional data storage unit.

It is to be further understood that, because some of the constituent system components and methods showed in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A computer system for supporting a compressed main memory, the system comprising:

a plurality of processors, each processor having a respective processor cache;

a memory controller in signal communication with the processor caches;

a compression translation table entry register in signal communication with the processor caches and the memory controller;

a compression translation table directory in signal communication with the compression translation table entry register;

a compressed main memory in signal communication with the memory controller wherein the memory controller manages the compressed main memory by storing entries of the compression translation table directory into the processor cache from the compression translation table entry register; and at least one circuit for generating the appropriate invalidation traffic to the other processor caches for entries read from and written to a respective processor cache by the memory controller.

2. A computer system as defined in claim 1 wherein the memory controller comprises the compression translation table entry register.

3. A computer system as defined in claim 1 wherein the compressed main memory comprises the compression translation table directory.

4. A computer system as defined in claim 1 wherein the compressed main memory comprises an uncompressed portion.

5. A computer system as defined in claim 1 wherein the compressed main memory is logically partitioned into a data portion and a compression-translation table portion.

6. A method for supporting a compressed main memory in a computer system having a processor cache and a memory controller, the method comprising:

receiving a real address for a processor cache miss;

finding a compression translation table address for the cache miss within the processor cache;

if the cache miss is a cache write miss, decompressing the memory line corresponding to the cache line being written, writing the content of the cache line into the appropriate position in the memory line, compressing the data contained in said memory line, and storing the compressed data into the compressed main memory;

if the cache miss is a cache read miss, retrieving the compressed data corresponding to the compression translation table address from the compressed main memory and decompressing the retrieved data;

accessing the compressed data by at least one of a path through the processor cache and a direct path to the compressed main memory; and selecting the at least one path in response to at least one of the real address and the physical address of the data in the compressed main memory.

7. A method as defined in claim 6, further comprising:

dividing the real address space into equal-size compression units;

maintaining the physical contents of the compressed main memory corresponding to a compression unit in a compressed format;

keeping the contents of the processor cache in an uncompressed format; and translating between real addresses and physical addresses in correspondence with a compression translation table directory residing in an uncompressed portion of main memory.

8. A method as defined in claim 6, further comprising reducing the decompression latency due to accessing the compression translation table directory by saving recently accessed entries of the directory in the processor cache.

9. A method as defined in claim 6, further comprising allowing the memory controller to select which entries of the compression translation table directory are written into the processor cache.

10. A method as defined in claim 6, further comprising keeping the contents of recently decompressed compression units uncompressed in an uncompressed portion of the compressed main memory.

11. A method as defined in claim 10, further comprising:

limiting the maximum number of uncompressed compression units; and using a data structure to manage said uncompressed compression units.

12. A method as defined in claim 6, further comprising:

accessing the processor cache when retrieving an entry of the compression translation table directory; and accessing the compressed main memory if the entry of the compression translation table directory is not contained in the processor cache.

13. A method as defined in claim 6 wherein each entry of the processor cache has an additional flag to distinguish between real addresses and physical addresses.

14. A method as defined in claim 13 wherein:

the entries of the processor cache having said additional flag set to denote that the address is a real address contain data used by one or more processes run by the processor or program code; and the entries of the processor cache having said additional flag set to denote that the address is a physical address contain entries of the compression translation table directory.

15. A method as defined in claim 13 wherein cache queries issued by the processor never result in a hit on a cache line where said additional flag is set to denote that the address cached in the cache line is a physical address.

16. A method as defined in claim 13 wherein cache queries issued by the memory controller never result in a hit on a cache line where said additional flag is set to denote that the address cached in the cache line is a real address.

17. A method as defined in claim 6, further comprising dividing the physical main memory into a first region where physical addresses coincide with real addresses, and a second region where real addresses are translated into physical addresses.

18. A method as defined in claim 17, further comprising storing the compression translation table directory used to translate real addresses into physical addresses in the region where physical addresses coincide with real addresses.

19. A method as defined in claim 17, further comprising allowing the memory controller to select which entries of the compression translation table directory are written into the processor cache.

20. A method as defined in claim 17, further comprising:

defining the region where physical addresses coincide with real addresses at initial program load; and initializing the content of the region where physical addresses coincide with real addresses at initial program load.

21. A method as defined in claim 17 wherein said region where physical addresses coincide with real addresses is a contiguous region of the compressed main memory that starts at the lowest available address of the memory.

22. A method as defined in claim 17 wherein:

said region where physical addresses coincide with real addresses comprises at least one interval of the compressed main memory; and each said at least one interval is defined by a pair of registers in the memory controller where one of the registers in the pair contains the starting physical address of the interval and the other one of the registers in the pair contains the ending physical address of the interval.

23. A method as defined in claim 17, further comprising preventing a virtual memory manager of an operating system from allocating page frames within the region where physical addresses coincide with real addresses.

24. A method as defined in claim 6 wherein the memory controller does not write compression translation table entries of cache lines to the processor cache as a response to a cache write-back operation.

25. A method as defined in claim 6 wherein the memory controller writes a compression translation table entry of a cache line to the processor cache as a response to a cache write-back operation only if writing said entry does not result in another cache write-back operation.

26. A method as defined in claim 6 wherein the memory controller writes compression translation table entries of cache lines to the processor cache as a response to a cache write-back operation only if the utilization of the memory write buffer is low.

27. A method as defined in claim 6 wherein the memory controller writes to the processor cache the compression translation table entries of cache lines as a response to a cache write-back operation only if at least one of the following conditions is true:

the utilization of the memory write buffer is low;

writing said compression translation table entry to the processor cache does not result in another cache write-back operation.

28. A method as described in claim 6, further comprising allowing automatic discrimination between processor cache lines containing compression translation table directory entries of the compressed main memory and other processor cache lines containing code and data.

29. A method as described in claim 6, further comprising selectively caching the entries of the compression translation table directory to prevent the unnecessary eviction of the content of cache lines from the processor cache to free space for entries of the compression translation table directory to thereby eliminate the possibility of deadlocks that could result from unrestricted caching of the entries.

30. A method as described in claim 6, further comprising maintaining in uncompressed form the content of recently accessed compressed main memory data to reduce the access time to said data.

31. A system for supporting a compressed main memory in a computer system having a processor cache and a memory controller, the system comprising:

receiving means for receiving a real address for a processor cache miss;

finding means for finding a compression translation table address for the cache miss within the processor cache;

compressing means for determining if the cache miss is a cache write miss, compressing data corresponding to the compression translation table address and storing the compressed data into the compressed main memory;

decompressing means for determining if the cache miss is a cache read miss, retrieving the compressed data corresponding to the compression translation table address from the compressed main memory and decompressing the retrieved data;

access path means for accessing the compressed data by at least one of a path through the processor cache and a direct path to the compressed main memory; and selection means for selecting the at least one path in response to at least one of the real address and the physical address of the data in the compressed main memory.

32. A program storage device readable by machine, tangibly embodying a program of instructions executable by the machine to perform method steps for supporting a compressed main memory in a computer system having a processor cache and a memory controller, the method steps comprising:

receiving a real address for a processor cache miss;

finding a compression translation table address for the cache miss within the processor cache;

if the cache miss is a cache write miss, compressing data corresponding to the compression translation table address and storing the compressed data into the compressed main memory;

if the cache miss is a cache read miss, retrieving the compressed data corresponding to the compression translation table address from the compressed main memory and decompressing the retrieved data;

accessing the compressed data by at least one of a path through the processor cache and a direct path to the compressed main memory; and selecting the at least one path in response to at least one of the real address and the physical address of the data in the compressed main memory.

* * * * *